United States Patent

Uchida et al.

Patent Number: 6,046,299
Date of Patent: Apr. 4, 2000

[54] INK-JET PRINTING DYE-FIXING AGENT, AND RECORDING PAPER EMPLOYING THE SAME

[75] Inventors: Tatsuo Uchida; Noriaki Kobayashi; Ikuo Kameoka, all of Fukui, Japan

[73] Assignee: Nicca Chemical Co., Ltd., Fukui, Japan

[21] Appl. No.: 08/949,816

[22] Filed: Oct. 14, 1997

[30] Foreign Application Priority Data

Oct. 24, 1996 [JP] Japan ................... 8-282518

[51] Int. Cl.⁷ ............ C08G 73/10; C08G 69/26; C08G 69/08
[52] U.S. Cl. ............ 528/170; 528/310; 528/322; 528/330; 528/332; 528/335
[58] Field of Search ................ 528/170, 330, 528/310, 322, 332, 335

[56] References Cited

U.S. PATENT DOCUMENTS 3,862,094  1/1975  Shinohara et al. .................. 252/500

FOREIGN PATENT DOCUMENTS 0074622 of 1993 European Pat. Off. .
56-84992 of 1981 Japan .
60-49990 of 1985 Japan .
63-049478 of 1988 Japan .
692012 of 1994 Japan .
2000164 of 1979 United Kingdom .

OTHER PUBLICATIONS

Tsuchida et al.; "Polycation polymers of the integral type obtained from the reaction of . . . compounds", KOGYOKA-GAKUSSI, vol. 74 No. 4 (1971) pp. 756–753.

*Primary Examiner*—P. Hampton-Hightower
*Attorney, Agent, or Firm*—Leydig, Voit & Mayer, Ltd.

[57] ABSTRACT

An ink-jet printing dye-fixing agent is provided which comprises a quaternary cationic polymer having the main chain represented by general formula (1):

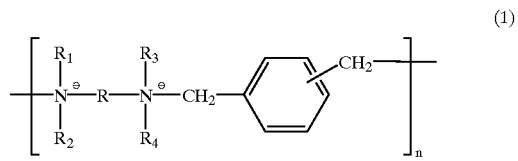

where $R_1$, $R_2$, $R_3$, and $R_4$ are independently an aliphatic alkyl group of 1 or 2 carbons; R is an aliphatic alkene group of 1–6 carbons or a phenylene group; and n is an integer of from 3 to 300. A recording paper sheet employing the fixing agent is also provided. This fixing agent has excellent ink dye fixability, and makes ink coloring excellent and improves water resistance of the printed matter.

6 Claims, No Drawings

INK-JET PRINTING DYE-FIXING AGENT, AND RECORDING PAPER EMPLOYING THE SAME

BACKGROUND OF THE INVENTION

1. Field of the Invention

The present invention relates to an ink-jet printing dye-fixing agent. Particularly, the present invention relates to an ink-jet printing dye-fixing agent which is applied onto a surface of a recording medium or incorporated into the recording medium for ink-jet printing. The present invention also relates to a recording paper sheet employing the dye-fixing agent.

2. Related Background Art

In recent years, computers have become popular not only in enterprises and educational facilities but also in general families. With the popularization of the computer, many kinds of printers have been developed and come to be used for outputting the data. A typical printing system is ink-jet printing, which is increasingly employed in color printing. The dyes for the ink-jet printing are generally water-soluble. The water-solubleness of the dye impairs water resistance of the printed characters and images, causing feathering or color-running by water deposition to render the printed character or picture indecipherable.

Various fixing agents have been reported for fixation of ink-jet printing dyes to improve the water resistance of the dye. For example, JP-A-56-84992 (Japanese Patent Laid-Open No.) discloses quaternized polyvinylpyridine, JP-A-60-49990 discloses polyalkylenepolyamine-dicyandiamide condensates, and JP-A-6-92012 discloses reaction products of a secondary amine with an epihalohydrin.

Conventional fixing agent for ink-jet printing dyes does not necessarily give sufficient water resistance, or may impair the color development depending on the kind of the dye. No conventional ink-jet printing dye-fixing agent is satisfactory simultaneously for the water resistance and for color development of the dye.

SUMMARY OF THE INVENTION

An object of the present invention is to provide an ink-jet printing dye-fixing agent which gives sufficient water resistance and color developing properties of the dye without the above disadvantages of conventional fixing agents.

After comprehensive investigation on the fixing agent for ink-jet printing dye, it was found by the inventors of the present invention that high water resistance and excellent color development properties in ink-jet printing can be achieved by use of a dye-fixing agent composed of a quaternary cationic polymer having the main chain constituted of quaternized cationic diamine units and aromatic ring units. The present invention has been accomplished based on the above findings.

The present invention provides an ink-jet printing dye-fixing agent, comprising a quaternary cationic polymer having the main chain represented by general formula (1):

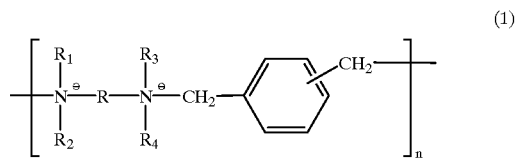

where $R_1$, $R_2$, $R_3$, and $R_4$ are independently an aliphatic alkyl group of 1 or 2 carbons; R is an aliphatic alkene group of 1–6 carbons, or a phenylene group; and n is an integer of from 3 to 300.

The above ink-jet printing dye-fixing agent may be one in which the aforementioned quaternary cationic polymer is represented by general formulas (1'), (1"), or (1'''):

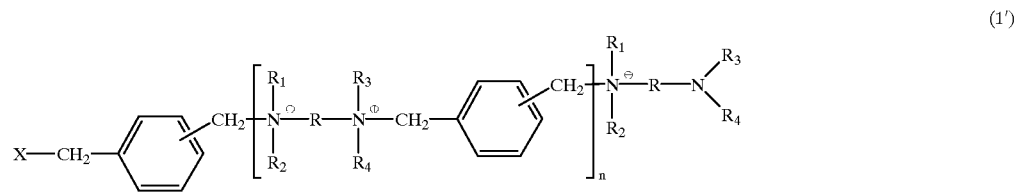

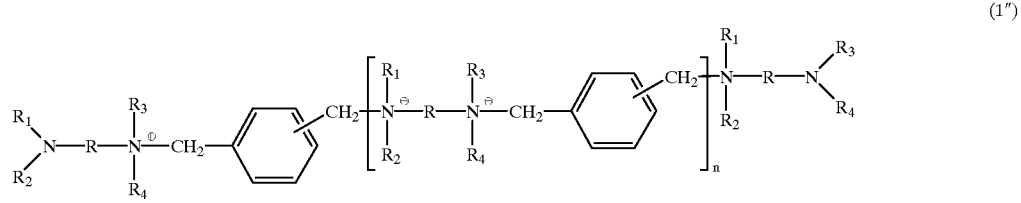

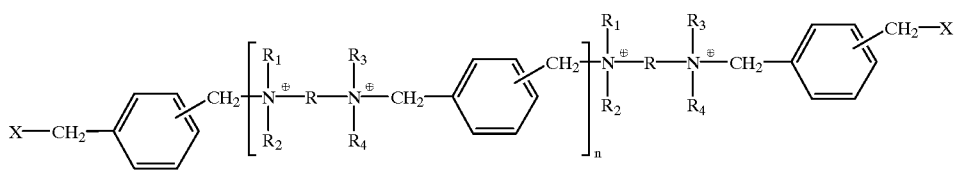

where $R_1$, $R_2$, $R_3$, and $R_4$ are independently an aliphatic alkyl group of 1 or 2 carbons; R is an aliphatic alkene group of 1–6 carbons, or a phenylene group; X is a halogen atom; and n is an integer of from 3 to 300.

Preferably in the aforementioned quaternary cationic polymer, $R_1$, $R_2$, $R_3$, and $R_4$ are respectively a methyl group; R is a group of ethylene, propylene, or phenylene; and n is an integer of from 3 to 250.

The present invention further provides an ink-jet printing dye-fixing agent comprising a quaternary cationic polymer, which is produced by reacting at least one di-tertiary diamine selected from the group of the di-tertiary diamines represented by general formula (2) with at least one xylene dihalide (i.e., α,α'-dihalogenoxylene) selected from the group of the xylene halides represented by general formula (3):

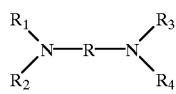

(2)

where $R_1$, $R_2$, $R_3$, and $R_4$ are independently an aliphatic alkyl group of 1 or 2 carbons; R is an aliphatic alkene group of 1–6 carbons or a phenylene group,

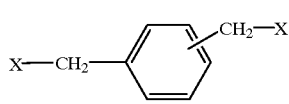

(3)

where X is a halogen atom.

In the above fixing agent, preferably, $R_1$, $R_2$, $R_3$, and $R_4$ are respectively a methyl group; R is a group of ethylene, propylene, or phenylene.

The present invention further provides an ink-jet printing recording paper sheet, which contains the aforementioned ink-jet printing dye-fixing agent on the surface thereof.

DESCRIPTION OF THE PREFERRED EMBODIMENT

The ink-jet printing dye-fixing agent, and the recording paper sheet employing the dye-fixing agent of the present invention are described below in more detail.

(Quaternary Cationic Polymer)

The quaternary cationic polymer used as the ink-jet printing dye-fixing agent of the present invention has a main chain constituted of the unit represented by general formula (1) below composed of a quaternary amine cation and an aromatic ring:

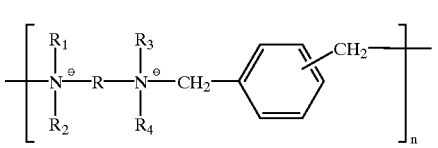

(1)

where the group R bonding the quaternary amine cations together is an aliphatic alkene group having 1–6 carbons or a phenylene group, preferably methylene, ethylene, propylene, or unsubstituted phenylene. The quaternary cationic polymer is quaternized by aliphatic alkyl groups $R_1$–$R_4$ of 1 or 2 carbons, preferably the $R_1$–$R_4$ alkyl groups being methyl respectively. The $R_1$–$R_4$ groups may be the same or different.

The polymerization degree, the molecular weight, and the molecular weight distribution of the above quaternary cationic polymer used in the present invention are not specially limited. However, the polymerization degree, namely n in the general formula (1), is preferably in the range from 3 to 300, more preferably from 3 to 250. The polymer of the polymerization degree of less than 3 can not insolubilize sufficiently the dye as described below, whereas the polymer of the polymerization degree higher than 300 can have a high solution viscosity which may result in inconvenience in coating, and other handling. The end groups of the quaternary cationic polymer of the present invention are not specially limited, provided that the polymer has the main chain represented by the above general formula (1).

Even the quaternary cationic polymer of relatively low polymerization degree (n about 3–10) can be used with little influence of the kind of the end groups of the polymer. Therefore, the quaternary cationic polymer may be obtained from various source materials by various polymerization processes. The end groups may be respectively xylene dihalide as represented below in formula (1'''), may be respectively tertiary amine as in formula (1''), or may be one xylene dihalide and one tertiary amine as in formula (1'). The group X (halogen) of the end group may be replaced by another group, such as a hydroxyl group or an ester group, by hydrolysis or under the synthesis conditions. The halogen atom is not specially limited, including Cl, Br, I, and F, preferably Cl and Br. The quaternary cationic polymer of the present invention is represented by general formulas (1'), (1''), or (1''').

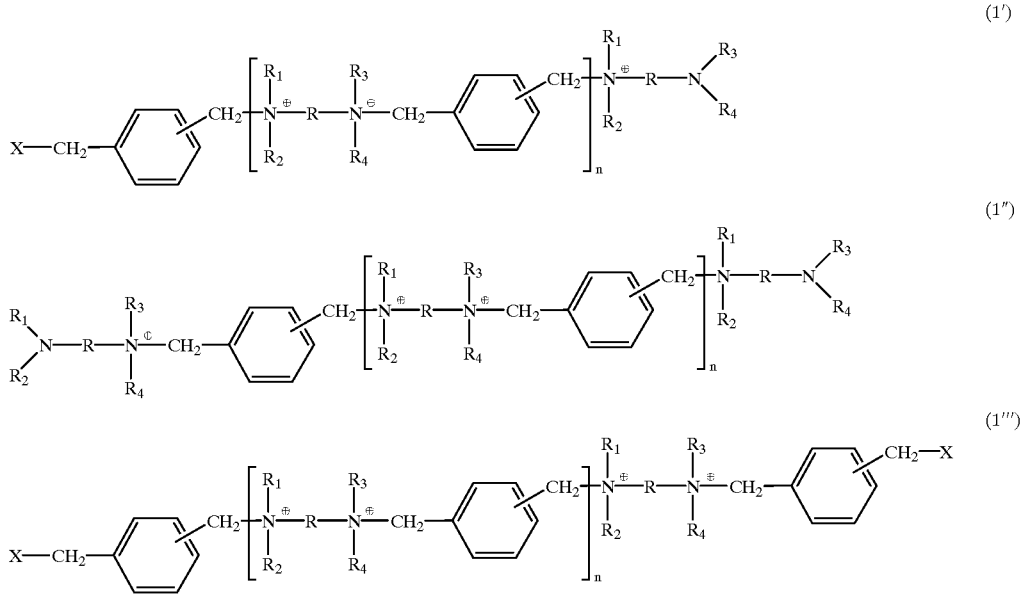

where $R_1$, $R_2$, $R_3$, and $R_4$ are independently an aliphatic alkyl group of 1 or 2 carbons; R is an aliphatic alkene of 1–6 carbons, or a phenylene group; X is a halogen atom; and n is an integer of from 3 to 300.

The molecular weight (weight-average molecular weight, Mw) of the aforementioned quaternary cationic polymer employed in the present invention is preferably ranges from 1000 to 90000, but is not limited thereto. The molecular weight can be changed by selecting the reaction conditions in the synthesis process as described below. The weight-average molecular weight (Mw) can be measured by gel permeation chromatography, or other methods.

(Synthesis Process for Quaternary Cationic Polymer)

The quaternary cationic polymer of the present invention can be synthesized by any known method (see, for example, Kogyo Kagaku Zasshi, Vol.74, No.4, p.756–763 (1971)). The quaternary cationic polymer having preferred structure for the present invention can be synthesized by polymerization by quaternization of a di-tertiary diamine with a dibenzyl halide (e.g., xylene dihalide).

The diamine employed for this reaction is represented by the general formula below:

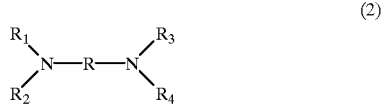

(2)

where $R_1$–$R_4$ and R are as defined above. The aliphatic alkyl groups $R_1$–$R_4$ has respectively one or two carbons. The diamine having aliphatic alkyl groups $R_1$–$R_4$ of 3 or more carbons tends to have lower reactivity in the quaternization. The useful diamine includes di-tertiary aminoalkanes such as
N,N,N',N'-tetramethyldiaminomethane,
N,N,N',N'-tetramethyl-1,2-diaminoethane,
N,N,N',N'-tetramethyl-1,3-diaminopropane,
N,N,N',N'-tetramethyl-1,4-diaminombutane,
N,N,N',N'-tetramethyl-1,5-diaminopentane,
N,N,N',N'-tetramethyl-1,6-diaminohexane,
N,N,N',N'-tetraethyldiaminomethane,
N,N,N',N'-tetraethyl-1,2-diaminoethane;
and aromatic di-tertiary diamines such as
N,N,N',N'-tetramethyl-o-phenylenediamine,
N,N,N',N'-tetramethyl-m-phenylenediamine, and N,N,N', N'-tetramethyl-p-phenylenediamine.

As the other component, a xylene dihalide represented by general formula (3) is used for synthesis of the quaternary cationic polymer of the present invention.

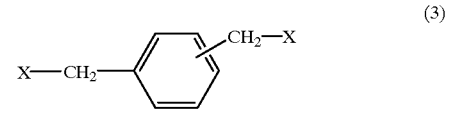

(3)

where X is as defined before. The xylene dihalide includes o-xylene dichloride, m-xylene dichloride, p-xylene dichloride, o-xylene dibromide, m-xylene dibromide, and p-xylene dibromide.

The quaternary cationic polymer of the present invention can be produced by mixing and heating the di-tertiary diamine and the xylene dihalide mentioned above in a suitable solvent to cause quaternization reaction. This reaction can be conducted under the reaction conditions employed generally for synthesis of a quaternary ammonium salt from a tertiary amine and a halide. The quaternary cationic amine can be produced quantitatively by reaction of the di-tertiary diamine and the xylene dihalide. The solvent suitable for the aforementioned reaction is not specially limited, and includes various hydrophilic solvents usually employed in synthesis of quaternary ammonium salts, including, water, alcohols, and esters. In the present invention, preferred are water, and alcohol type solvents such as ethanol, isopropanol, ethylene glycol, butylglycol, diethylene glycol monobutyl ether, 3-methyl-methoxybutanol, and propylene glycol monomethyl ether.

The polymerization degree (n), and the molecular weight distribution (Mw/Mn, determined by gel permeation chromatography) can be controlled mainly by selection of the reaction temperature, the reaction time, and the reaction solvent (see, for example, Kogyo Kagaku Zassi, Vol.74, No.4, p.756–763 (1971)).

The reaction temperature is not limited, and is preferably in the range of from room temperature to the boiling point of the solvent. The reaction is generally conducted by refluxing the reaction mixture in the solvent. Alternatively, the reaction may be conducted at a temperature higher than the boiling point of the solvent under an elevated pressure by use of an autoclave or the like.

In the synthesis reaction of the quaternary cationic polymer of the present invention, the di-tertiary diamine is used preferably in an amount equivalent substantially in moles to the xylene dihalide. The term "equivalent substantially" means 0.9–1.1 moles of the di-tertiary diamine per mole of the xylene dihalide.

During the synthesis reaction, decrease of the amount of the tertiary amine, increase of the amount of the formed quaternary cationic polymer, rise of the viscosity of the solution, and changes of other properties can be monitored, for example, by thin layer chromatography, nuclear magnetic resonance spectrometry, and gel permeation chromatography. In particular, the thin layer chromatography is preferred because of its simplicity in monitoring. Further, the specific reaction of quaternary ammonium salts is useful for monitoring the reaction (see, for example, "Kaimen Kasseizai Handobukku (Surface Active Agent Handbook), New Edition: edited by Yoshida, Shindo, Ogaki, and Yamanaka, published by Kogaku Tosho K. K., 1991 (2nd edition), p.562–575).

Generally, under the conditions above, the objective quaternary cationic polymer can be obtained at a purity of 80% or higher (the purity being calculated, for example, from the reaction degrees of the starting di-tertiary diamine and xylene dihalide).

Specifically, any appropriate combination of the di-tertiary diamine and the xylene dihalide mentioned above can be reacted under the preferable reaction conditions shown below:

(1) Isopropanol, or water is employed as the reaction solvent;
(2) One mole of the xylene dihalide is used per mole of the di-tertiary diamine;
(3) The di-tertiary diamine and the xylene dihalide are dissolved in water-isopropanol, and are allowed to react in the solution at about 90° C. for about 4 hours to complete the reaction; and
(4) During the reaction, the decrease of the di-tertiary diamine, the increase of the produced quaternary cationic polymer, and so forth are monitored, if necessary. The monitoring can be conducted, for example, by thin layer chromatography, and a like method. Otherwise, the monitoring can be conducted by nuclear magnetic resonance spectrometry, or a like method (see, for example, "Kaimen Kasseizai Handobukku (Surface Active Agent Handbook), New Edition: edited by Yoshida, Shindo, Ogaki, and Yamanaka, published by Kogaku Tosho K. K., 1991 (2nd edition), p.618–627).

The intended high molecular weight (large n) of the quaternary cationic polymer can be achieved by lengthening the reaction time or raising the reaction temperature (for example, raising the reaction temperature above the boiling temperature of the reaction temperature by use of an autoclave as the reactor). The molecular weight (Mw) of the obtained quaternary cationic polymer in the present invention is measured by gel permeation chromatography (GPC) by reference to standard dextran for GPC measurement.

(Use of Quaternary Cationic Polymer As Ink-Jet Printing Dye-Fixing Agent)

The quaternary cationic polymer of the present invention, when used as an ink-jet printing dye-fixing agent, is considered to bond to the dye in the aqueous ink deposited by ink-jet recording owing to the quaternary cationic property to insolubilize the dye and to prevent thereby elution of the dye. Furthermore, the ink-jet printing dye-fixing agent containing the quaternary cationic polymer of the present invention is considered to have a higher affinity with the aromatic ring of the dye due to the specific aromatic ring constituting the main chain of the quaternary cationic polymer of the present invention, to improve thereby the water resistance and color developing properties of the dye. Accordingly, the ink-jet printing dye-fixing agent comprising the quaternary cationic polymer of the present invention gives sufficient water resistance and color developing properties of the dye independently of the kind of the dye without the disadvantages of conventional fixing agent because of the aforementioned two effects.

The ink-jet printing dye-fixing agent of the present invention should contain the aforementioned quaternary cationic polymer, but the other components are not specially limited. Water is preferred as the solvent of the fixing agent.

The ink-jet printing dye-fixing agent of the present invention may contain a binder, an inorganic pigment, or an organic pigment used conventionally. The binder includes oxidized starch and polyvinyl alcohol. The inorganic pigment includes soft calcium carbonate, heavy calcium carbonate, kaolin (white clay), talc, calcium sulfate, barium sulfate, titanium oxide, zinc oxide, zinc sulfate, zinc carbonate, satin white, aluminum silicate, kieselguhr, calcium silicate, synthetic silica, aluminum hydroxide, alumina, and lithopone. The organic pigment includes styrenic plastic pigments, acrylic plastic pigments, microcapsules, and carbon resin pigments.

The dye-fixing agent of the present invention may contain arbitrarily a defoaming agent, a dispersing agent, a thickener, a colorant, an antistatic agent, an antiseptic agent, a water-soluble resin, an adhesive, or the like.

The method of using the ink-jet printing dye-fixing agent of the present invention is not limited specially. The quaternary cationic polymer of the present invention should be distributed over the surface of the recording medium, but may soak into the interior of the recording medium. The ink-jet printing dye-fixing agent of the present invention may be applied by use of an air-knife coater, a roll coater, a blade coater, a bar coater, a brush coater, a Champlex coater, a gravure coater, or the like onto a plain paper sheet or a coated paper sheet, and be dried. For example, on a plain paper sheet or a coated paper sheet, the quaternary cationic polymer is applied in an amount ranging from 0.1 to 10.0 g/m$^2$, preferably from 0.2 to 5.0 g/m$^2$.

The dye-fixing agent of the present invention may be mixed with pulp fiber slurry which is made into a paper sheet. The pulp fiber is mainly composed of wood pulp, and may contain additionally a fibrous material such as synthetic pulp, synthetic fiber, glass fiber, and the like. Otherwise, a plain paper sheet or a coated paper sheet may be immersed in a treating bath containing the ink-jet printing dye-fixing agent of the present invention, excess of the bath liquid is removed, and the paper sheet is dried. A size press is useful for the application of the dye-fixing agent.

The ink-jet printing dye used in combination of the ink-jet printing dye-fixing agent of the present invention is not specially limited. Specially effective are the inks containing at least one of water-soluble anionic direct dyes and water-soluble acid dyes, and additionally a wetting agent, a dye-dissolving agent, an antiseptic agent, or the like.

The water-soluble direct dye suitable for use in the present invention includes C.I.Direct Black dyes of 2, 4, 9, 11, 14, 17, 19, 22, 27, 32, 36, 38, 41, 48, 49, 51, 56, 62, 71, 74, 75, 77, 78, 80, 105, 106, 107, 108, 112, 113, 117, 132, 146, 154, and 194; C.I. Direct Yellow dyes of 2, 4, 8, 11, 12, 24, 25, 26, 27, 28, 33, 34, 39, 41, 42, 44, 48, 50, 51, 58, 72, 85, 86, 87, 88, 98, 100, and 110; C.I. Direct Orange dyes of 3, 8, 10, 26, 29, 39, 41, 49, 51, and 102; C.I. Direct Red dyes of 1, 2, 4, 8, 9, 11, 13, 17, 18, 20, 23, 24, 28, 31 33, 37, 39, 44, 46, 47, 48, 51, 59, 62, 63, 73, 75, 77, 80, 81, 83, 84, 85, 90, 94, 99, 101, 108, 110, 145, 189, 197, 220, 224, 225, 226, 227, and 230; C.I. Direct Violet dyes of 1, 7, 9, 12, 35, 48, 51, 90, and 94; C.I. Direct Blue dyes of 1, 2, 6, 8, 15, 22, 25, 34, 69, 70, 71, 72, 75, 76, 78, 80, 81, 82, 83, 86, 90, 98, 106, 108, 110, 120, 123, 158, 163, 165, 192, 193, 194, 195, 196, 199, 200, 201, 202, 203, 207, 218, 236, 237, 239, 246, and 258; C.I. Direct Green dyes of 1, 6, 8, 28, 33, 37, 63, and 64; and C.I. Direct Brown dyes of 1, 2, 6, 25, 27, 44, 58, 95, 100, 101, 106, 112, 173, 194, 195, 209, 210, and 211. The water-soluble acidic dye suitable for use in the present invention includes C.I. Acid Black dyes of 1, 2, 7, 15, 17, 24, 26, 28, 31, 41, 48, 52, 60, 63, 94, 107, 109, 112, 118, 119, 121, 122, 131, 155, and 156; C.I. Acid Yellow dyes of 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 99, 111, 114, 116, 122, 135, 161, and 172; C.I. Acid Orange dyes of 7, 8, 10, 33, 56, and 64; C.I. Acid Red dyes of 1, 4, 6, 8, 13, 14, 15, 18, 19, 21, 26, 27, 30, 32, 34, 35, 37, 40, 42, 51, 52, 54, 57, 80, 82, 83, 85, 87, 88, 89, 92, 94, 97, 106, 108, 110, 115, 172, 176, 180, 184, 186, 187, 249, 254, 317, and 318; C.I. Acid Violet dyes of 7, 11, 15, 34, 35, 41, 43, 49, and 75; C.I. Acid Blue dyes of 1, 7, 9, 22, 23, 25, 27, 29, 40, 41, 43, 45, 49, 51, 53, 55, 56, 59, 62, 78, 80, 81, 83, 90, 92, 93, 102, 104, 111, 113, 117, 120, 124, 126, 145, 167, 171, 175, 183, 229, 234, and 236; C.I. Acid Green dyes of 3, 12, 19, 27, and 41; and C.I. Acid Brown 4, and 14. But the dyes are not limited thereto.

The recording medium which is useful for use of the quaternary cationic polymer of the present invention as the ink-jet printing dye-fixing agent is not specially limited. Ordinary printing paper sheets and ordinary recording paper sheets are useful. Moreover, not only paper sheets but also resinous films, synthetic paper sheets, and cloths are useful as the recording medium.

The present invention is described below in more detail by reference to Examples without limiting the invention.

EXAMPLE 1

In a reaction vessel (1-liter flask), were mixed 53 g of N,N,N',N'-tetramethyl-1,2-diaminoethane, 26 g of isopropyl alcohol, 79 g of p-xylene dichloride, and 281 g of water. The mixture was heated, and was allowed to react at a refluxing temperature of about 90° C. for about 4 hours. A sample was taken out from the reaction mixture, and the disappearance of the unreacted source materials was confirmed by subjecting the sample to thin silica gel layer development with a development solvent composed of chloroform: methanol: isopropanol: aqueous 25% ammonia=10:5:5:4. Then the reaction was stopped to obtain an aqueous solution of the quaternary cationic polymer at a concentration of about 30% by weight. This quaternary cationic polymer had a weight-average molecular weight of about 10000 by measurement with a gel permeation chromatography system [High-speed GPC, HLC-8120 manufactured by Tosoh Corporation; column: TSK Gel G2500PW$_{XL}$, 3000PW$_{XL}$, and 4000PW$_{XL}$; measurement standard: dextran].

An ink-jet recording paper sheet was prepared by use of the obtained quaternary cationic polymer as the dye-fixing agent of the present invention. Specifically, an A4-size PPC paper sheet as the base sheet was treated for padding with the above aqueous dye-fixing agent solution containing the quaternary cationic polymer at a concentration of 30% by weight (2-dip/2-nip, pick-up of 70%), and the paper sheet was dried at 70° C. for 5 minutes to obtain the ink-jet recording paper sheet of the present invention.

EXAMPLE 2

In a reaction vessel, were mixed 33 g of N,N,N',N'-tetramethyl-1,2-diaminopropane, 18 g of isopropyl alcohol, 44 g of p-xylene dichloride, and 161 g of water. The mixture was heated, and was allowed to react at a refluxing temperature of about 90° C. for about 4 hours. Disappearance of the unreacted source materials was confirmed by subjecting a sample of the reaction mixture to thin silica gel layer development with a development solvent composed of chloroform: methanol: isopropanol: aqueous 25% ammonia= 10:5:5:4. Then the reaction was stopped to obtain an aqueous solution of the quaternary cationic polymer at a concentration of about 30% by weight. This quaternary cationic polymer had a weight-average molecular weight of about 9000.

An ink-jet recording paper sheet was prepared by use of the obtained quaternary cationic polymer as the dye-fixing agent of the present invention. Specifically, an A4-size PPC paper sheet as the base sheet was treated for padding with the above aqueous dye-fixing agent solution containing the quaternary cationic polymer at a concentration of 30% by weight (2-dip/2-nip, pick-up of 70%), and the paper sheet was dried at 70° C. for 5 minutes to obtain the ink-jet recording paper sheet of the present invention.

EXAMPLE 3

In a reaction vessel, were mixed 28 g of N,N,N',N'-tetramethyl-p-phenylenediamine, 15 g of isopropyl alcohol, 35 g of p-xylene dichloride, and 132 g of water. The mixture was heated, and was allowed to react at a refluxing temperature of about 90° C. for about 4 hours. Disappearance of the unreacted source materials was confirmed by subjecting a sample of the reaction mixture to thin silica gel layer development with a development solvent composed of chloroform: methanol: isopropanol: aqueous 25% ammonia= 10:5:5:4. Then the reaction was stopped to obtain an aqueous solution of the quaternary cationic polymer at a concentration of about 30% by weight. This quaternary cationic polymer had a weight-average molecular weight of about 6000.

An ink-jet recording paper sheet was prepared by use of the obtained quaternary cationic polymer as the dye-fixing agent of the present invention. Specifically, an A4-size PPC paper sheet as the base sheet was treated for padding with the above aqueous dye-fixing agent solution containing the quaternary cationic polymer at a concentration of 30% by weight (2-dip/2-nip, pick-up of 70%), and the paper sheet was dried at 70° C. for 5 minutes to obtain the ink-jet recording paper sheet of the present invention.

EXAMPLE 4

In a 1-liter autoclave, were mixed 53 g of N,N,N',N'-tetramethyl-1,2-diaminoethane, 26 g of isopropyl alcohol, 79 g of p-xylene dichloride, and 281 g of water. The mixture was heated, and was allowed to react at a temperature of 120° C. for about 6 hours. Disappearance of the unreacted source materials was confirmed by subjecting a sample of the reaction mixture to thin silica gel layer development with a development solvent composed of chloroform: methanol: isopropanol: aqueous 25% ammonia=10:5:5:4. Then the reaction was stopped to obtain an aqueous solution of the quaternary cationic polymer of a concentration of about 30% by weight. This quaternary cationic polymer had a weight-average molecular weight of about 60000.

An ink-jet recording paper sheet was prepared by use of the obtained quaternary cationic polymer as the dye-fixing agent of the present invention. Specifically, an A4-size PPC paper sheet as the base sheet was treated for padding with the above aqueous dye-fixing agent solution containing the quaternary cationic polymer at a concentration of 30% by weight (2-dip/2-nip, pick-up of 70%), and the paper sheet was dried at 70° C. for 5 minutes to obtain the ink-jet recording paper sheet of the present invention.

COMPARATIVE EXAMPLE 1

An ink-jet recording paper sheet for comparison was prepared in the same manner as in Example 1 except that water only was used without using the quaternary cationic polymer.

COMPARATIVE EXAMPLE 2

An ink-jet recording paper sheet for comparison was prepared in the same manner as in Example 1 except that polyvinylpyridine quaternized by dimethyl sulfate (molecular weight of about 5000) was used in place of the quaternary cationic polymer.

COMPARATIVE EXAMPLE 3

An ink-jet recording paper sheet for comparison was prepared in the same manner as in Example 1 except that a polyalkylenepolyamine dicyandiamide condensate (Neofix RP-70, Nicca Chemical Co.,LTD.) was used in place of the quaternary cationic polymer.

(Test Method and Evaluation)

On the recording paper sheets prepared in the above Examples and Comparative Examples, printing was conducted by means of a bubble jet printer [BJC-35V: manufactured by Canon K.K., Canon printer inks: BJI-10 (black), and BJI-11 (cyan, magenta, and yellow). The printed matters were tested and evaluated as below.

(1) Coloring Property Test:

The coloring properties were evaluated by visual observation of the density (color development) of the printed characters immediately after the printing.

Evaluation:

A: Coloring is good.

B: Coloring is fair without problem in practical use.

C: Coloring is poor and useless practically.

(2) Water Resistance Test 1:

One drop of water (about 0.05 mL) was allowed to fall from the height of 5 cm onto the printed matter, and the water resistance (repulsion of water drop) and fixation (feathering) of printed characters were evaluated visually.

Evaluation of water resistance (water repulsion):

A: Water is repelled.

B: Water soaks slightly into the paper sheet.

C: Water soaks immediately into the paper sheet.

Evaluation of fixation:

A: Printed characters do not flow nor spread.

B: Printed characters spread slightly.

C: Printed characters flow with water.

(3) Water Resistance Test 2:

The printed recording paper sheet was immersed in still water for 5 minutes. Then the density of the printed character was observed and evaluated visually.

A: Printed characters do not spread, and printed color is clear.

B: Printed characters do not spread, but coloring is not clear.

C: Printed characters spread.

Table 1 shows the evaluation results of the recording paper sheets.

TABLE 1

|  | Example | | | | Comparative Example | | |
|---|---|---|---|---|---|---|---|
|  | 1 | 2 | 3 | 4 | 1 | 2 | 3 |
| Ink coloring test | | | | | | | |
| Colors | A | A | A | A | A | B | A |
| Black | A | A | A | A | A | B | B |

TABLE 1-continued

|  | Example | | | | Comparative Example | | |
|---|---|---|---|---|---|---|---|
|  | 1 | 2 | 3 | 4 | 1 | 2 | 3 |
| Water resistance test 1 | | | | | | | |
| Water repulsion Fixability | A | A | A | A | A | A | A |
| Colors | A | B | A | A | C | A | A |
| Black | A | A | A | A | C | C | B |
| Water resistance test 2 | | | | | | | |
| Colors | A | A | A | A | C | A | A |
| Black | A | A | A | A | C | C | B |

Colors: cyan, magenta, and yellow

Table 1 shows that the ink-jet printing dye-fixing agent of the present invention exhibits excellent fixability and achieves excellent ink coloring properties and sufficient water resistance even when the dye employed is water-soluble, while a conventional fixing agent does not give simultaneously sufficient coloring properties and water resistance to water-soluble dyes.

As described above, when the ink-jet printing is conducted with an aqueous ink (containing a direct dye or an acid dye), the quaternary cationic polymer of the present invention will bond to a dye of an aqueous ink to insolubilize the dye on the surface or in the interior of a paper sheet to prevent elution of the dye. The use of the quaternary cationic polymer of the present invention enables production of an ink-jet printing dye-fixing agent, which has high ink fixability, and makes ink coloring excellent and improves water resistance of the printed matters.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No.8-282518 (282518/1996) filed on Oct. 24, 1996 is hereby incorporated by reference.

What is claimed is:

1. A method of making an ink-jet printing dye-fixing agent comprising a quaternary cationic polymer, the method comprising reacting at least one di-tertiary diamine selected from the group consisting of the di-tertiary diamines represented by general formula (1) with at least one xylene dihalide selected from the group consisting of the xylene dihalides represented by general formula (2):

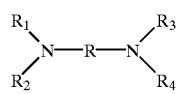

(1)

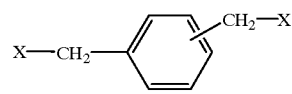

(2)

where $R_1$, $R_2$, $R_3$, and $R_4$ are, independently, an aliphatic alkyl group having 1 or 2 carbon atoms; R is an aliphatic alkene group having 1 to 6 carbon atoms, or a phenylene group; and where X is a halogen atom.

2. The method of claim 1, wherein the ink-jet printing dye-fixing agent comprises a quaternary cationic polymer having a main chain represented by general formula (1):

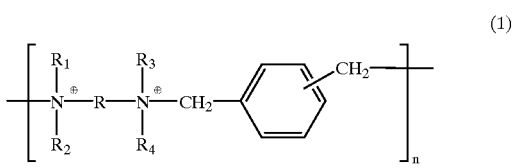

(1)

where $R_1$, $R_2$, $R_3$, and $R_4$ are independently an aliphatic alkyl group having 1 or 2 carbon atoms; R is an aliphatic alkene group having 1 to 6 carbon atoms, or a phenylene group; and n is an integer of from 3 to 300.

3. The method of claim 2, wherein the quaternary cationic polymer is represented by general formula (1'):

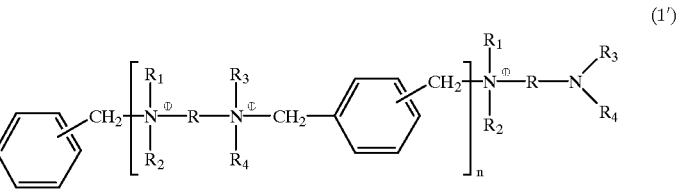

(1')

where $R_1$, $R_2$, $R_3$, and $R_4$ are independently an aliphatic alkyl group having 1 or 2 carbon atoms; R is an aliphatic alkene group having 1 to 6 carbon atoms, or a phenylene group; X is a halogen atom; and n is an integer of from 3 to 300.

4. The method of claim 2, wherein $R_1$, $R_2$, $R_3$, and $R_4$ are respectively a methyl group; R is a group of ethylene, propylene, or phenylene; and n is an integer of from 3 to 250.

5. The method of claim 3, wherein $R_1$, $R_2$, $R_3$, and $R_4$ are respectively a methyl group; R is a group of ethylene, propylene, or phenylene; and n is an integer of from 3 to 250.

6. The method of claim 1, wherein $R_1$, $R_2$, $R_3$, and $R_4$ are respectively a methyl group; and R is a group of ethylene, propylene, or phenylene.

* * * * *